United States Patent
Wroblewski et al.

(10) Patent No.: US 8,194,815 B2
(45) Date of Patent: Jun. 5, 2012

(54) APPARATUS AND SYSTEM FOR DAMPENING THE VIBRATION EXPERIENCED BY AN OBJECT

(75) Inventors: Norbert B. Wroblewski, Wilmington, NC (US); Michael S. DeFilippis, Wilmington, NC (US); Lee J. Andre, Carolina Beach, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 470 days.

(21) Appl. No.: 12/414,129

(22) Filed: Mar. 30, 2009

(65) Prior Publication Data
US 2010/0246744 A1 Sep. 30, 2010

(51) Int. Cl.
*G21C 9/00* (2006.01)
(52) U.S. Cl. .......................... 376/285; 376/277; 376/260
(58) Field of Classification Search .................. 376/362, 376/364, 461; 976/DIG. 168
See application file for complete search history.

(56) References Cited

U.S. PATENT DOCUMENTS

| | | | |
|---|---|---|---|
| 4,185,802 A * | 1/1980 | Myles et al. | 248/74.4 |
| 5,544,849 A * | 8/1996 | Peterson et al. | 248/74.1 |
| 6,456,682 B1 * | 9/2002 | Jensen | 376/282 |
| 2006/0082139 A1 * | 4/2006 | Jensen | 285/192 |
| 2008/0042018 A1 * | 2/2008 | Pothanikat et al. | 248/55 |

* cited by examiner

*Primary Examiner* — Ricardo Palabrica
*Assistant Examiner* — Marshall O'Connor
(74) *Attorney, Agent, or Firm* — Ryan Alley Intellectual Property Law

(57) ABSTRACT

An embodiment of the present invention may reduce the level of vibration experienced by a line, such as, but not limiting of, a pipe, a cable, tubing, or the like, that is connected to at least one separate structure. For example, but not limiting of, the structure includes: a reactor pressure vessel, a sparger pipe, steam generator, a pipe, a pressure vessel, a heat exchanger, a pump, a condenser, a tank, or the like. An embodiment of the present invention may provide support and a preload to the line at a new location or may replace an existing support, such as, but not limiting of, a weld; which may alter the natural frequencies to avoid resonance from occurring when the structure(s) is excited.

14 Claims, 5 Drawing Sheets

APPARATUS AND SYSTEM FOR DAMPENING THE VIBRATION EXPERIENCED BY AN OBJECT

BACKGROUND OF THE INVENTION

The present application relates generally to nuclear reactors; and more particularly to, a system for dampening the level of vibration experienced by system piping within a nuclear reactor pressure vessel.

One type of nuclear reactor, a conventional boiling water reactor (BWR) is shown in FIG. 1. During operation of the reactor, coolant water circulating inside a reactor pressure vessel (RPV) 10 is heated by nuclear fission produced in the nuclear fuel core 35. Feedwater is admitted into the RPV 10 via a inlet 15 and a sparger pipe 20, which is adjacent a core spray line 105. The flows downwardly through a downcomer annulus 25, which is an annular region between RPV 10 and a core shroud 30.

The core shroud 30 is a stainless steel cylinder that surrounds the nuclear fuel core 35, which includes a plurality of fuel bundle assemblies 40 (only a few are illustrated in FIG. 1). A top guide 45 and a core plate 50 supports each of the fuel bundle assemblies 40.

The coolant water flows downward through the downcomer annulus 25 and into the core lower plenum 55. Then the water in the core lower plenum 55 flows upward through the nuclear fuel core 35. In particular, water enters the fuel bundle assemblies 40, wherein a boiling boundary layer is established. A mixture of water and steam exits the nuclear fuel core 35 and enters the core upper plenum 60 under the shroud head 65. The steam-water mixture then flows through standpipes 70 on top of the shroud head 65 and enters the steam separators 75, which separate water from steam. The separated water is recirculated back to the downcomer annulus 25 and the steam flows out of the RPV 10 and to a steam turbine, or the like, (not illustrated).

The BWR also includes a coolant recirculation system, which provides the forced convection flow through the nuclear fuel core 35 necessary to attain the required power density. A portion of the water is drawn from the lower end of the downcomer annulus 25 via recirculation water outlet 80 and forced by a recirculation pump (not illustrated) into a plurality of jet pump assemblies 85 (one is illustrated in FIG. 1) via recirculation water inlets 90. The jet pump assemblies 85 are typically circumferentially distributed around the core shroud 30 and provide the required reactor core flow. A typical BWR has sixteen to twenty-four inlet mixers 95.

As illustrated in FIG. 1, a conventional jet pump assembly 85 comprises a pair of inlet mixers 95. Each inlet mixer 95 has an elbow welded thereto, which receives pressurized driving water from a recirculation pump (not illustrated) via an inlet riser 100. A type of inlet mixer 95 comprises a set of five nozzles circumferentially distributed at equal angles about the inlet mixer axis (not illustrated in the Figures). Here, each nozzle is tapered radially inwardly at the nozzle outlet. This convergent nozzle energizes the jet pump assembly 85. A secondary inlet opening (not illustrated) is radially outside of the nozzle exits. Therefore, as jets of water exit the nozzles, water from the downcomer annulus 25 is drawn into the inlet mixer 95 via the secondary inlet opening, where mixing with water from the recirculation pump then occurs.

During RPV 10 operation, the flow through the sparger pipe 20 contains pressure fluctuations from various sources in the reactor system. These pressure fluctuations can have frequencies close to one or more natural vibration modes of the sparger pipe 20. The vibration modes experienced by the sparger pipe 20 depends, in part on, on preload and welds on the lugs 110 (not illustrated in FIG. 1) of the sparger pipe 20. The welds may also serve to keep the sparger pipe 20 at a specific distance away from the core spray line 105. In addition to pressure fluctuations, there may be other sources of vibration that can have frequencies close to one or more natural vibration modes of the sparger pipe 20. When an excitation frequency is near the natural frequencies of the sparger pipe 20, the resulting vibration may crack the welds on the lugs 110 and remove the preload from the sparger pipe 20. This can result in loss of the indication of core flow, which may require shutdown of the RPV 10.

There are a few possible problems with the currently known systems for dampening the vibration. Currently known systems involve re-welding the lugs 110, which may lead to a repeat failure. These systems generally require longer installation time and expose operators to longer period of radioactivity.

For the aforementioned reasons, there is a need for a new system for dampening the vibration experienced by the sparger pipe 20. The system should not require welding. The system should reduce the installation time and lower operator exposure to radioactivity.

BRIEF DESCRIPTION OF THE INVENTION

In accordance with an embodiment of the present invention, an apparatus for dampening vibration experienced by an object integrated with a structure within a reactor pressure vessel (RPV) of a nuclear power plant; wherein the apparatus comprises: a bearing plate configured for providing a barrier between an object and a structure, wherein the structure is located within a reactor pressure vessel (RPV) of a nuclear power plant; a lower section for holding a portion of the object, wherein a first surface of the lower section integrates with the bearing plate and a second surface of the lower section holds a portion of the object; an upper section for holding another portion of the object, wherein the upper section integrates with the bearing plate and mates with the lower section; wherein the lower section and the upper section cooperatively secure the object at a distance from a facing surface of the bearing plate, and allows for dampening of a vibration experienced by the object.

In accordance with another embodiment of the present invention, a system for reducing the vibration experienced by a pipe within a nuclear reactor pressure vessel (RPV), the system comprising: a nuclear fuel core comprising a plurality of fuel bundle assemblies; a inlet; a sparger pipe; a core spray line; and a clamp comprising an upper section and a lower section; wherein the clamp is connected to a portion of the sparger pipe to reduce a level of vibration experience by the sparger pipe; and wherein the clamp applies a compressive load to the sparger pipe and positions the sparger pipe and a distance from the core spray line.

BRIEF DESCRIPTION OF THE DRAWING

FIG. 3, are schematics illustrating exploded isometric views of a repair clamp in accordance with an embodiment of the present invention.

FIG. 4, are schematics illustrating isometric and side elevation views of an assembled repair clamp securing a portion of a sparger pipe in accordance with an embodiment of the present invention.

DETAILED DESCRIPTION OF THE INVENTION

Certain terminology is used herein for convenience only and is not to be taken as a limitation on the invention. For example, words such as "upper," "lower," "left," "front", "right," "horizontal," "vertical," "upstream," "downstream," "fore", and "aft" merely describe the configuration shown in the Figures. Indeed, the components may be oriented in any direction and the terminology, therefore, should be understood as encompassing such variations unless specified otherwise. Furthermore, the following discussion focuses on an embodiment of the present invention integrated with the sparger system of the RPV 10. Other embodiments of the present invention may be integrated with other systems that require a dampening of and/or frequency change in vibration.

The present invention has the technical effect of reducing the level of vibration experienced by a line, such as, but not limiting of, a pipe, a cable, tubing, or the like, that is connected to at least one separate structure. For example, but not limiting of, the structure includes: a RPV 10, a sparger pipe 20, steam generator, a pipe, a pressure vessel, a heat exchanger, a pump, a condenser, a tank, or the like. An embodiment of the present invention may provide support and a preload to the line at a new location or may replace an existing support, such as, but not limiting of, a weld; which may alter the natural frequencies to avoid resonance from occurring when the structure(s) is excited.

An embodiment of the present invention takes the form of an apparatus or system that may reduce the level of vibration experienced by a sparger pipe 20 or other similar object within a RPV 10. An embodiment of the present invention provides at least one repair clamp that generally adds support, to the sparger pipe 20. After installation, the repair clamp may lower the amplitude of, and/or change the frequency of, the vibration experienced by the sparger pipe 20.

Figure 1:
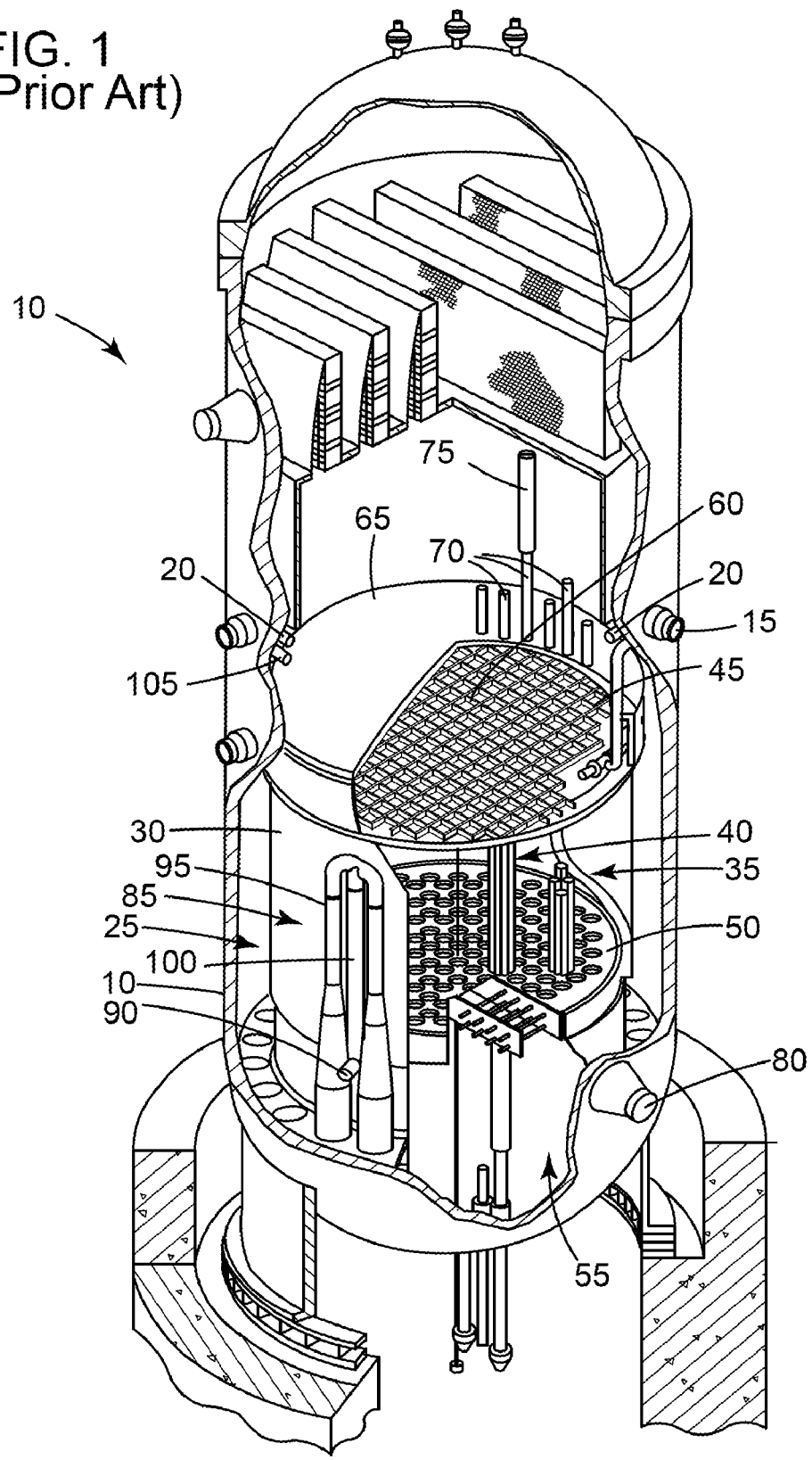
FIG. 1 is a schematic illustrating the environment in which an embodiment of the present invention operates.
Figure 2:
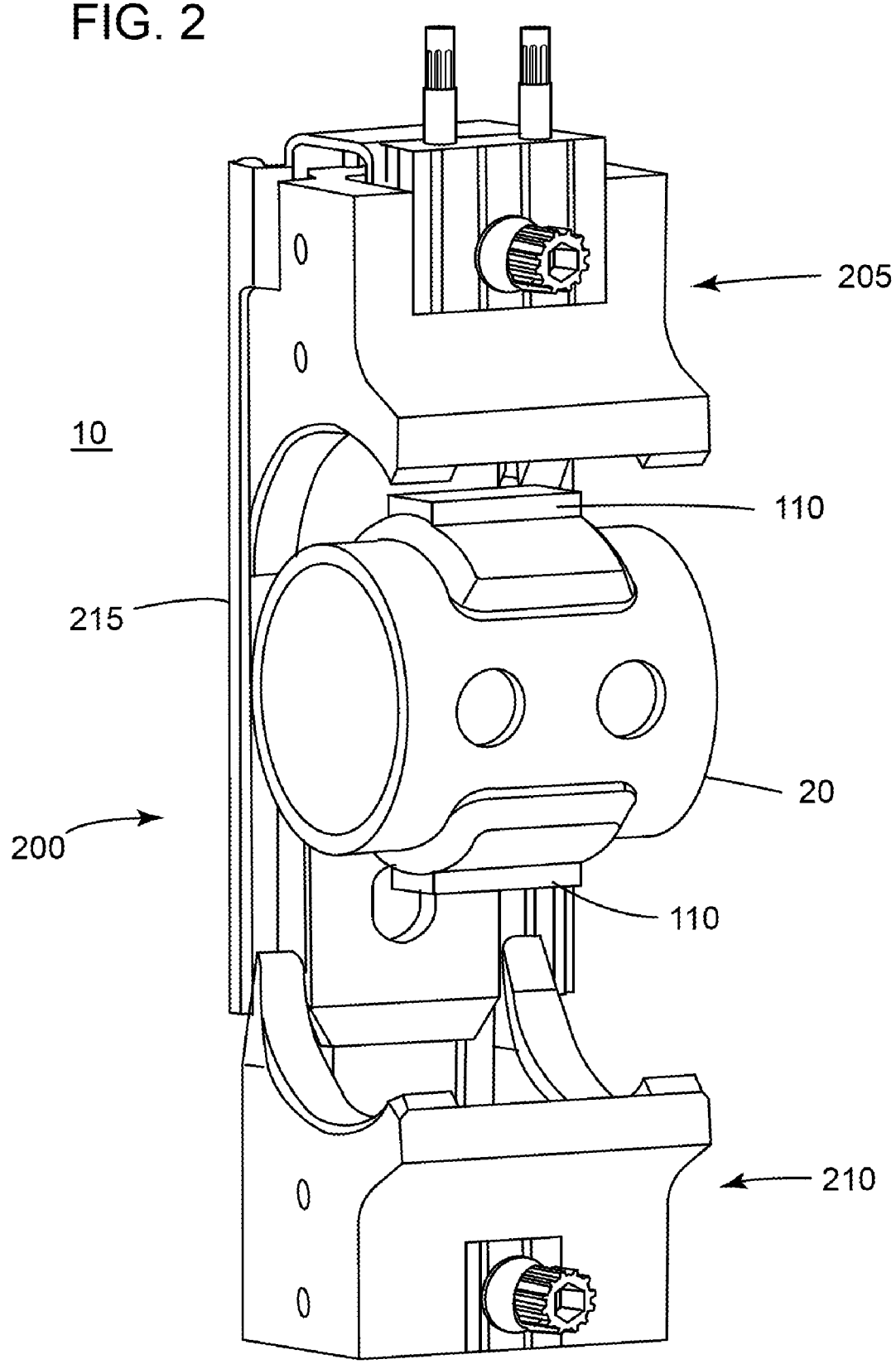
FIG. 2 is a schematic illustrating a partially exploded isometric view of an embodiment of a repair clamp within an environment in the present invention operates.

Referring again to the Figures, where the various numbers represent like parts throughout the several views. FIG. 2 is a schematic illustrating a partially exploded isometric view of an embodiment of a repair clamp 200 within an environment in the present invention operates. FIG. 2 illustrates the repair clamp 200 partially surrounding a portion of the sparger pipe 20. Here, the sparger pipe 20 includes a plurality of lugs 110.

An embodiment of the repair clamp 200 may comprise three main components. An upper section 205 for restraining a portion of the sparger pipe 20. A lower section 210 for restraining another portion of the sparger pipe 20 and for receiving a portion of the upper section 205. A bearing plate 215 for providing a barrier between the sparger pipe 20 and a wall of the RPV 10. Generally, the upper section 205 and the lower section 210 cooperatively operate to secure the sparger pipe 20 at a desired distance from the wall of the RPV 10 and from a surface of the core spray line 105. When installed the repair clamp 200 may add or restore a preload to the sparger pipe 20, while changing the amplitude and/or frequency of the potential vibration.

Figure 3A:
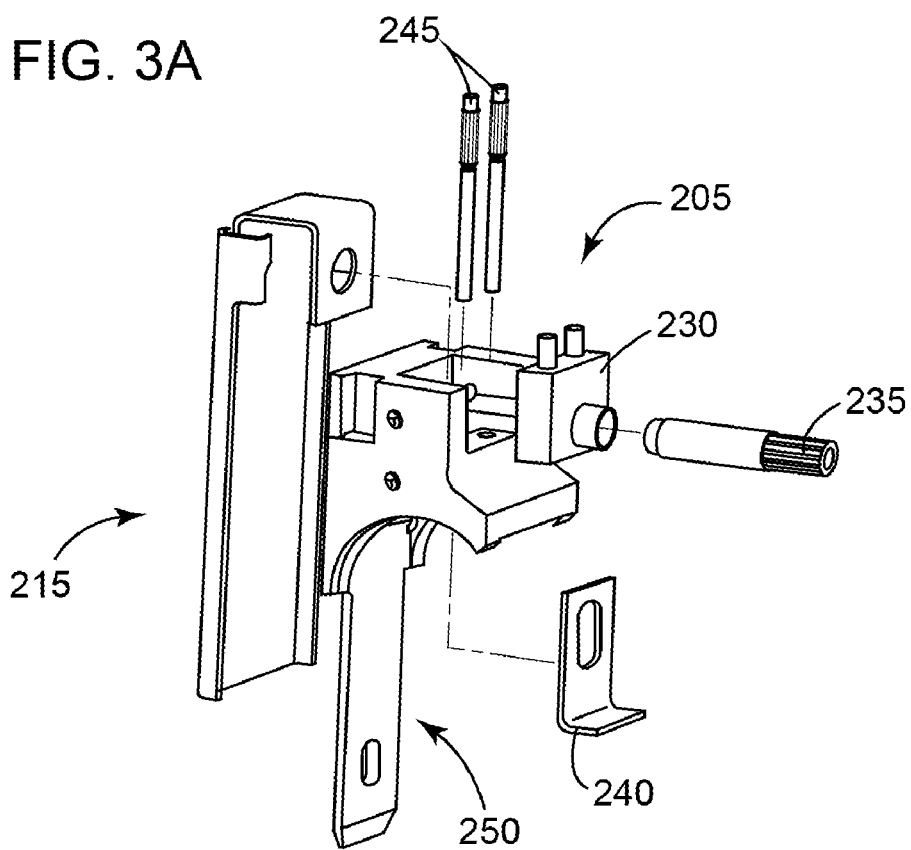
FIGS. 3A-3B, collectively
Figure 3B:
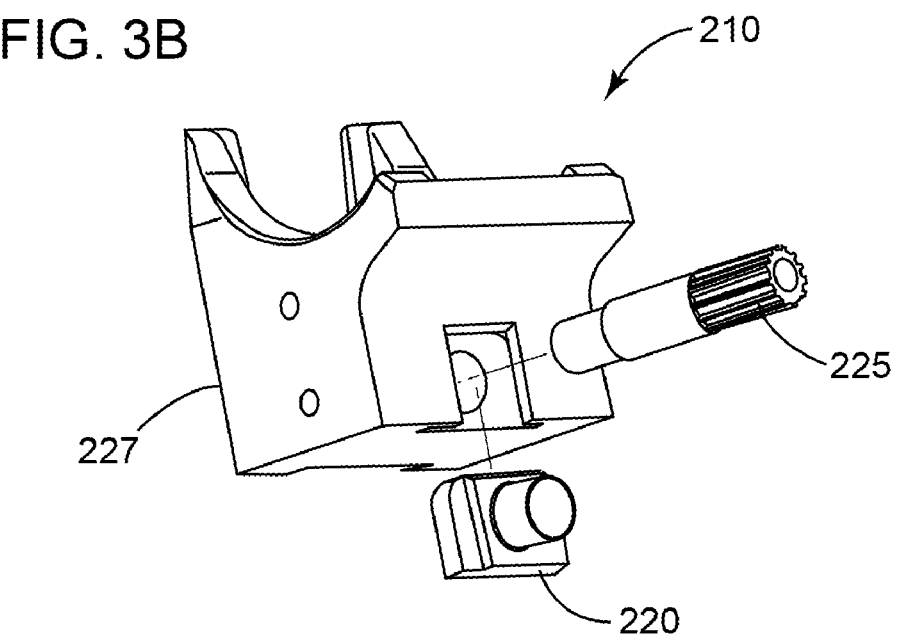

FIGS. 3A-3B, collectively FIG. 3, are schematics illustrating exploded isometric views of a repair clamp 200 in accordance with an embodiment of the present invention. FIG. 3A illustrates embodiments of the upper section 205 and the bearing plate 215 with the present invention. FIG. 3B illustrates an embodiment of the lower section 210 in with present invention.

Referring now to FIG. 3A, an embodiment of the upper section 205 may comprise: a second crimp collar 230, a second jacking bolt 235, a pinch plate 240, and at least one pinch bolt 245, all of which may assemble onto a upper clamp body 250 of the upper section 205 as illustrated, for example, but not limiting of, in FIG. 3A. The second jacking bolt 235 serves to connect the upper clamp body 250 with the hearing plate 215. The second jacking bolt 235 may comprise a variety of forms. An embodiment of the second jacking bolt 235 may comprise a cylindrical shaft with a series of threads, or other groves, that allow for mating with the second crimp collar 230 and the upper clamp body 250. An end portion of the second jacking bolt 235 may allow for a hand tool to rotate the second jacking bolt 235. For example, but not limiting of, the end portion may allow for a wrench to fasten the second jacking bolt 235 to the upper clamp body 250.

The second crimp collar 230 serves to fix the second jacking bolt 235 to a desired position. This may prevent the second jacking bolt 235 from loosening due to vibration after the repair clamp 200 is installed. An embodiment of the second crimp collar 230 may allow for the second jacking bolt 235 to pass through and mate with a portion of the upper clamp body 250, as illustrated, for example, but not limiting of, in FIG. 3A. An embodiment of the second crimp collar 230 may also allow for the at least one pinch bolt 245 to pass through. Here, the second crimp collar 230 may prevent the at least one pinch bolt 245 from loosening, due to vibration, after the repair clamp 200 is installed.

The at least one pinch bolt 245 serves to apply a compressive load from the repair clamp 200 to the sparger pipe 20. Essentially, the at least one pinch bolt 245 clamps the upper section 205 and the lower section 210 around a portion of the sparger pipe 20. An embodiment of the upper clamp body 250 may allow for the lug 110 to mate with a surface on the upper clamp body 250. This may allow for a robust connection between the repair clamp 200 and the sparger pipe 20. The pinch plate 240 may serve to provide a bearing surface between the at least one pinch bolt 245 and the second jacking bolt 235.

As illustrated in FIG. 3A, the upper clamp body 250 may comprise a plurality of recesses allowing for the aforementioned upper section 205 components to mate therein. The upper section 205 may also comprise groves for a top end of the bearing plate 215 to slidably attach. The upper clamp body 250 may also comprise a tang portion that allows for mating with the lower section 210, as described below.

A surface of the upper clamp body 250 may be of a shape allowing for mating with the portion of the sparger pipe 20. For example, but not limiting of, the shape may comprise an arc of a similar radius of the outer diameter of the sparger pipe 20. Moreover, the surface may comprise a notch, or the like, that allows for mating with the lug 110.

The bearing plate 215 serves as a barrier between the repair clamp 200 and a wall of the RPV 10. Generally, the bearing plate 215 may form the rear of the repair clamp 200 encompassing the rear portions of the upper section 205 and the lower section 210. In an embodiment of the present invention an overall length of the bearing plate 215 extends beyond an overall length of the upper section 205 mated with the lower section 210. This feature may allow for the applied forces of the second jacking bolt 235 and the first jacking bolt 225 to be transferred on the wall of the RPV 10.

Referring now to FIG. 3B that illustrates an exploded view of the lower section 210. An embodiment of the lower section 210 may comprise a first crimp collar 220 and a first jacking bolt 225, both of which may be integrated with a lower clamp body 227. The first crimp collar 220 generally functions similar to that of the second crimp collar 230, as previously described. The first jacking bolt 225 generally functions similar to that of the second jacking bolt 235, as previously described.

The lower clamp body 227 serves to receive and hold a portion of the sparger pipe 20. A first surface of the lower clamp body 227 may integrate with the bearing plate 215. A second surface of the lower clamp body 227 may be of a shape allowing for mating with the portion of the sparger pipe 20. For example, but not limiting of, the shape may comprise an arc of a similar radius of the outer diameter of the sparger pipe 20. Moreover, the second surface may comprise a notch, or the like, that allows for mating with the lug 110.

Figure 4A:
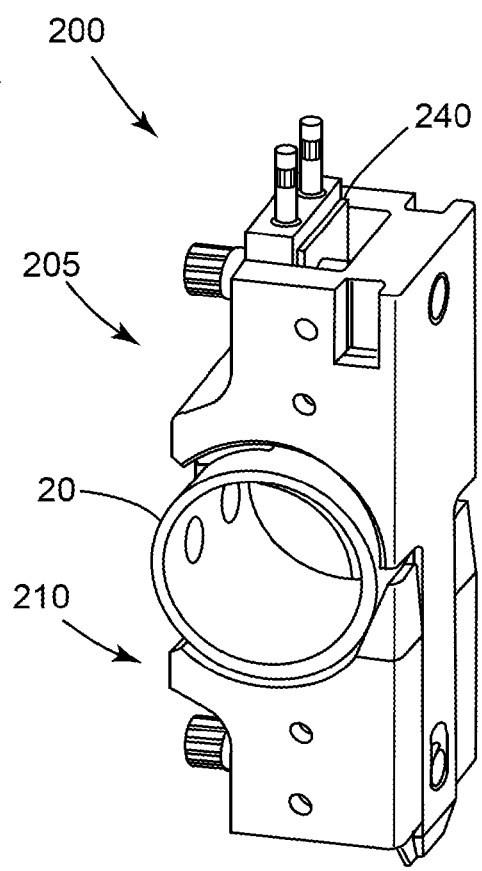
FIGS. 4A-4B, collectively
Figure 4B:
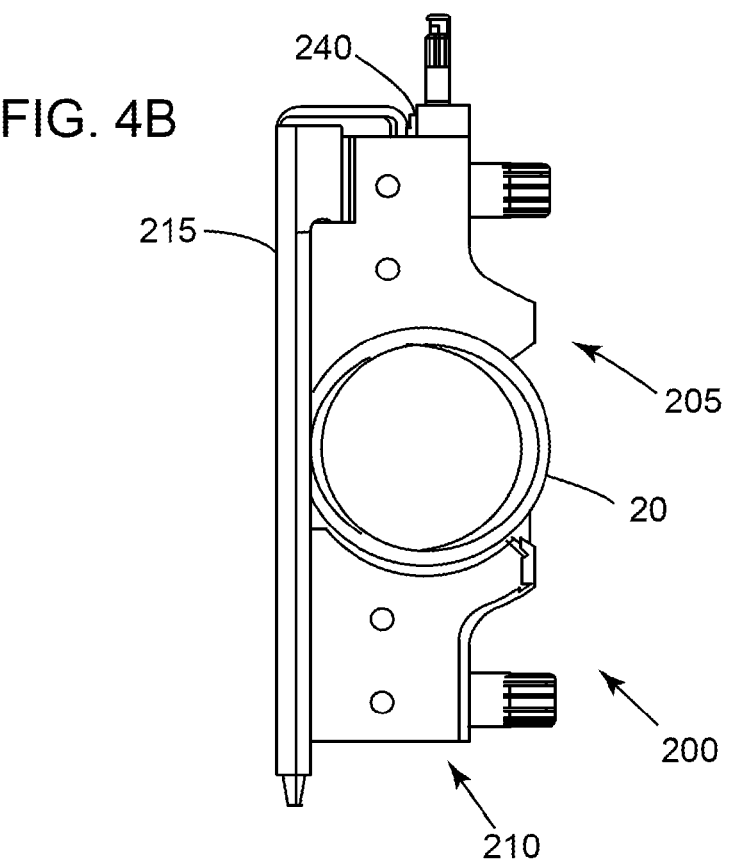

FIGS. 4A-4B, collectively FIG. 4, are schematics illustrating isometric and side elevation views of an assembled repair clamp 200 securing a portion of a sparger pipe 20 in accordance with an embodiment of the present invention. FIG. 4A illustrates a side isometric view. FIG. 4B illustrates an opposing side elevation view.

FIG. 4A specifically illustrates the upper section 205 and lower section 210 assembled and clamping onto the sparger pipe 20. Here, FIG. 4A illustrates how the tang portion of the upper clamp body 250 may slidably mate with the lower clamp body 227 in accordance with an embodiment of the present invention.

FIG. 4A also illustrates how the ends of the first jacking bolt 225 and the second jacking bolt 235 may extend through holes mating holes. Specifically, the upper clamp body 250 may have a hole that allows the second jacking bolt 235 to extend through and engage the bearing plate 215. Also, the lower clamp body 227 may comprise a recess or a notch that allows the tang portion of the upper clamp body 250 to fit therein. This may allow for the tang and a rear portion of the lower clamp body 227 to form the relatively flat rear portion of the lower section 210. Here, an embodiment of the upper clamp body 250 may comprise the tang portion having a hole that allows for the first jacking bolt 225 to extend through to engage the bearing plate 215.

FIG. 4A also illustrates how the position at least one pinch bolt 245 may be maintained by the second crimp collar 230. Here, after the at least one pinch bolt 245 provides the compressive load to secure the sparger pipe 20, the second crimp collar 230 may be used to prevent loosening, as previously described.

Referring now to FIG. 4B, which is an opposing side elevation view of FIG. 4A. FIG. 4B illustrates the repair clamp 200 having the bearing plate 215 and the pinch plate 240 connected to the upper section 205. As discussed, in an embodiment of the present invention the bearing plate 215 may serve as the back portion of the repair clamp 200. Also, the pinch plate 240 may provide a barrier between the second crimp collar 230 and the bearing plate 215. FIG. 4B also illustrates how the first jacking bolt 225 and the second jacking bolt 235 may reside within the respective crimp collar, 220, 230, as previously described. FIG. 4B also illustrates how the upper section 205 and the lower section 210 may partially surround a portion of the sparger pipe 20.

Figure 5:
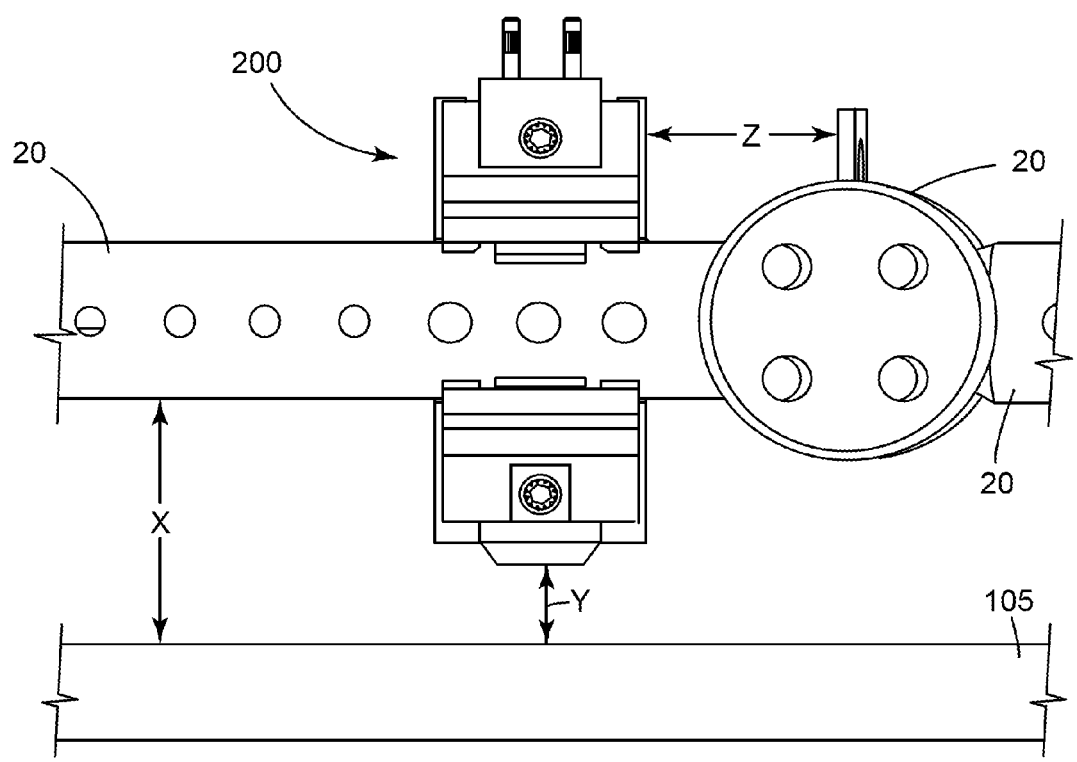
FIG. 5 is a schematic illustrating a plan view of a repair clamp installed on a sparger pipe, in accordance with an embodiment of the present invention.

FIG. 5 is a schematic illustrating a plan view elevation of a repair clamp 200 installed on a sparger pipe 20, in accordance with an embodiment of the present invention. FIG. 5 illustrates a few of the benefits of an embodiment of the present invention. A first benefit allows for a generous clearance around the repair clamp 200. When fully engaged the repair clamp 200 may provide a vertical distance of between the sparger pipe 20 and the core spray line 105, represented by dimension "X" in FIG. 5. When fully engaged the repair clamp 200 may also provide a distance of between a bottom surface of the repair clamp 200 and the core spray line 105, represented by dimension "Y" in FIG. 5. When fully engaged the repair clamp 200 may also provide a distance of between a side of the repair clamp 200 and a portion of the sparger pipe 20 represented by dimension "Z" in FIG. 5. The dimensional values and/or ranges of X, Y, and Z may be determined by the type of RPV 10 to which an embodiment of the repair clamp 200 is installed.

A second benefit of the repair clamp 200 allows for a range of approximately 0.250 inches of adjustment. This may accommodate a broad range of sparger pipe 20 positions relative to a wall of the RPV 10.

A third benefit involves the crimp collars 220,230, which may serves as a positive anti-rotation device. The crimp collars 220,230 may only require a visual inspection to confirm that the repair clamp 200 has not loosened.

The components of an embodiment present invention may be formed of any material capable of withstanding the operating environment to which the repair clamp 200 may be exposed.

In use, the repair clamp 200 may clamp around the sparger pipe 20 at a location of previous jacking bolts. When fully engaged, the repair clamp 200 may provide for generous clearance around the upper bounds of the sparger pipe 20 tolerance and connecting welds. The repair clamp 200 may restore the preload on the sparger pipe 20 at the location of the previous jacking bolts. The repair clamp 200 may also reduce the vibration experience by the sparger pipe 20.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims. For example, but not limiting of, an embodiment of the present invention may be used to: a) introduce a different vibration mode; h) to secure a pipe, cable, wire, or other similar object, at a fixed distance away from a separate structure or other object; or c) to apply a compressive load to at least one of the aforementioned objects.

What is claimed is:
1. An apparatus comprising:
   a bearing plate configured for providing a barrier between a sparger pipe and a structure, wherein the structure is located within a reactor pressure vessel (RPV) of a nuclear power plant; and wherein the pipe comprises at least a lower lug and an upper lug, both of which are located on an outer diameter of the pipe;
   a lower section including,
      a first jacking bolt,
      a first crimp collar configured to secure a position of the first jacking bolt and to affix the first jacking bolt to a designated position,
      a first lower surface that integrates with the bearing plate, and a second lower surface configured to hold a portion of the pipe, wherein the second lower surface comprises a lower notch configured to receive and mate with the lower lug; and an upper section slidably connected to the lower section, wherein the upper section includes,
  a hole, wherein the first jacking bolt is configured to move through the lower section, then the hole, and then terminate at a portion of the bearing plate so as to secure the upper section to the lower section,
  a first upper surface that integrates with the bearing plate, and
  a second upper surface that is configured to hold a portion of the pipe, wherein the second upper surface comprises an upper notch that is configured to receive and mate with the upper lug, wherein the bearing plate, the lower section, and the upper section are configured to secure the feedwater sparger pipe, and wherein the lower section and the upper section are configured to cooperatively secure the pipe at a distance from a facing surface of the bearing plate, and to allow for dampening of a vibration experienced by the pipe.

2. The apparatus of claim 1, wherein the upper section comprises:
  a second jacking bolt for affixing the upper section to the bearing plate, wherein the second jacking bolt is secured by a second crimp collar; and
  at least one pinch bolt for clamping the upper section and the lower section to the pipe, wherein the at least one pinch bolt is secured by the second crimp collar.

3. The apparatus of claim 2, further comprising a pinch plate, wherein the pinch plate provides a bearing surface between the at least one pinch bolt and the second jacking bolt.

4. The apparatus of claim 3, wherein the upper section comprises a cavity that allows for a portion of the second crimp collar, a portion of the bearing plate, and a portion of the pinch plate to reside.

5. The apparatus of claim 1, wherein a length of the bearing plate extends beyond a combined length of the upper section and the lower section when the upper section is integrated with the lower section.

6. The apparatus of claim 1, wherein a compressive load applied to the upper section and the lower section by at least one pinch bolt is configured to restrict movement of the first lug and the second lug.

7. The apparatus of claim 6, wherein the compressive load applied to the upper section and the lower section by the at least one pinch bolt is configured to restore preload onto the sparger pipe.

8. A system comprising:
  a nuclear fuel core comprising a plurality of fuel bundle assemblies;
  a inlet;
  a sparger pipe comprising at least a lower lug and an upper lug that are located on an outer diameter of the pipe;
  a core spray line; and
  a clamp comprising:
    a bearing plate configured for providing a barrier between a sparger pipe and a structure, wherein the structure is located within a reactor pressure vessel (RPV) housing the nuclear fuel core; and wherein the pipe comprises at least a lower lug and an upper lug, both of which are located on an outer diameter of the pipe;
    a lower section including,
      a first jacking bolt,
      a first crimp collar configured to secure a position of the first jacking bolt and to affix the first jacking bolt to a designated position,
      a first lower surface that integrates with the bearing plate, and
      a second lower surface that holds a portion of the pipe, wherein the second lower surface comprises a lower notch that receives and mates with the lower lug; and
    an upper section slidably connected to the lower section, wherein the upper section includes,
      a hole, wherein the first jacking bolt is configured to move through the lower section, then the hole, and then terminate at a portion of the bearing plate so as to secure the upper section to the lower section,
      a first upper surface that integrates with the bearing plate, and
      a second upper surface that holds a portion of the pipe, wherein the second upper surface comprises an upper notch that receives and mates with the upper lug,
    wherein the sparger pipe is secured by the bearing plate, the lower section, and the upper section, and
    wherein the lower section and the upper section cooperatively secure the pipe at a distance from a facing surface of the bearing plate, and allows for dampening of a vibration experienced by the pipe.

9. The system of claim 8, wherein the upper section comprises:
  a second jacking bolt for affixing the upper section to the bearing plate, wherein the second jacking bolt is secured by a second crimp collar; and
  at least one pinch bolt for clamping the upper section and the lower section to the sparger pipe, wherein the at least one pinch bolt is secured by the second crimp collar.

10. The system of claim 9, further comprising a pinch plate, wherein the pinch plate provides a bearing surface between the at least one pinch bolt and the second jacking bolt.

11. The system of claim 10, wherein the upper section comprises a cavity that allows for a portion of the second crimp collar, a portion of the bearing plate, and a portion of the pinch plate to reside therein.

12. The system of claim 8, wherein the bearing plate extends beyond the upper section and the lower section when the upper section is connected to the lower section.

13. The system of claim 11, wherein the sparger pipe comprises a plurality of lugs and a first lug mates with a portion of upper section and a second lug mates with a portion of the lower section; wherein a compressive load applied to the upper section and the lower section by the at least one pinch bolt restricts the movement of the first lug and the second lug.

14. The system of claim 13, wherein the compressive load applied to the upper section and the lower section by at least one pinch bolt applies a preload onto the sparger pipe.

* * * * *